Dec. 3, 1957  T. S. HARRIS, JR  2,814,946
LOAD MEASURING CELLS
Filed May 27, 1955  2 Sheets-Sheet 1
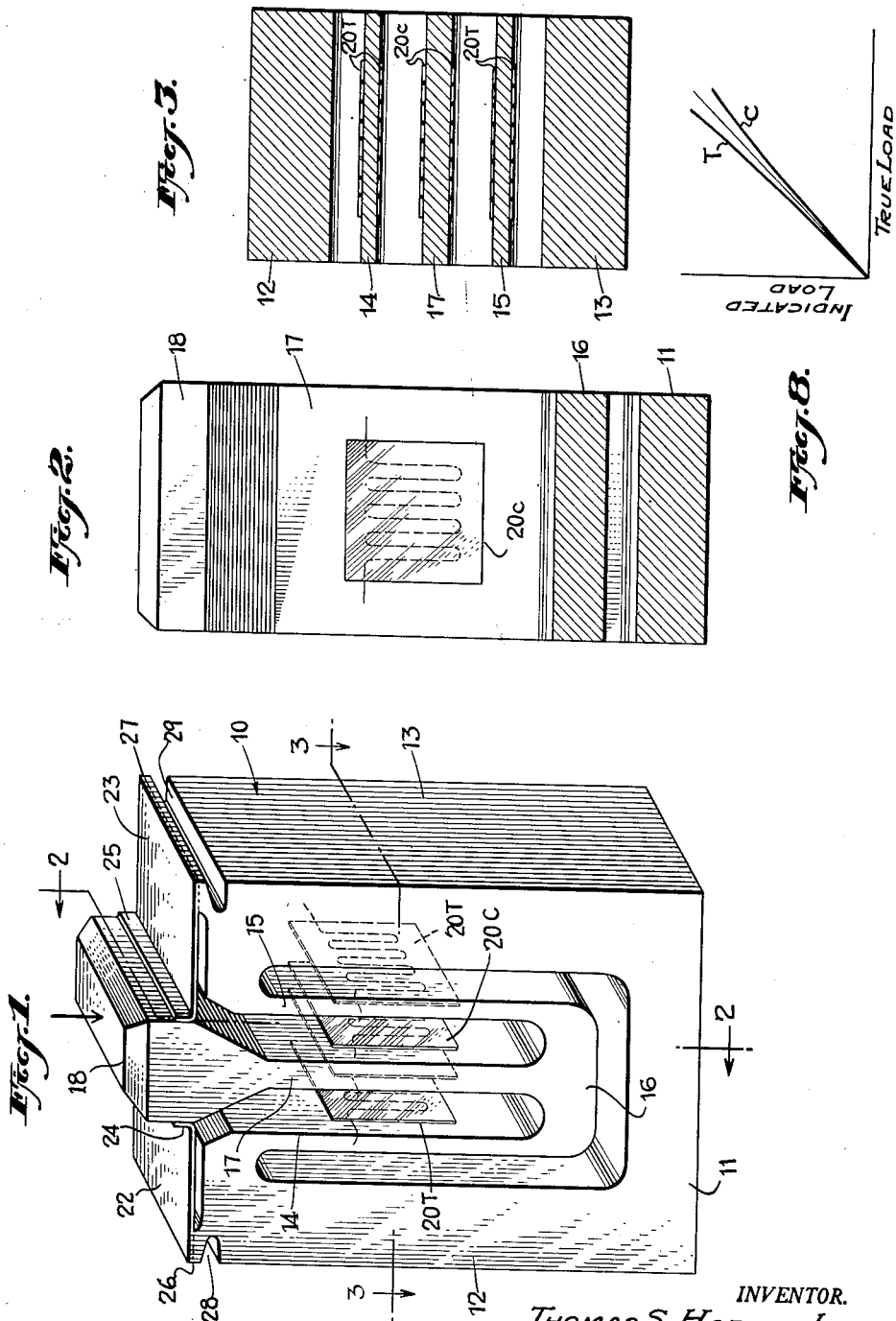
INVENTOR.
THOMAS S. HARRIS, JR.
BY
ATTORNEYS.

Dec. 3, 1957  T. S. HARRIS, JR  2,814,946
LOAD MEASURING CELLS
Filed May 27, 1955  2 Sheets-Sheet 2
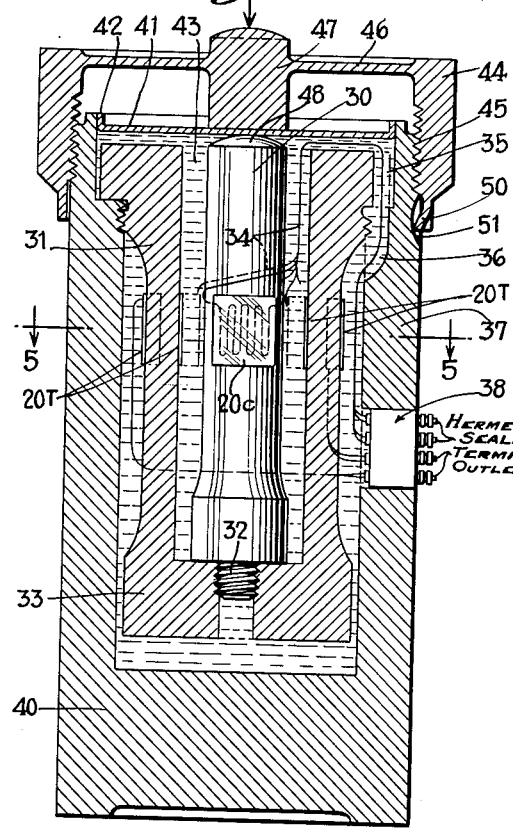
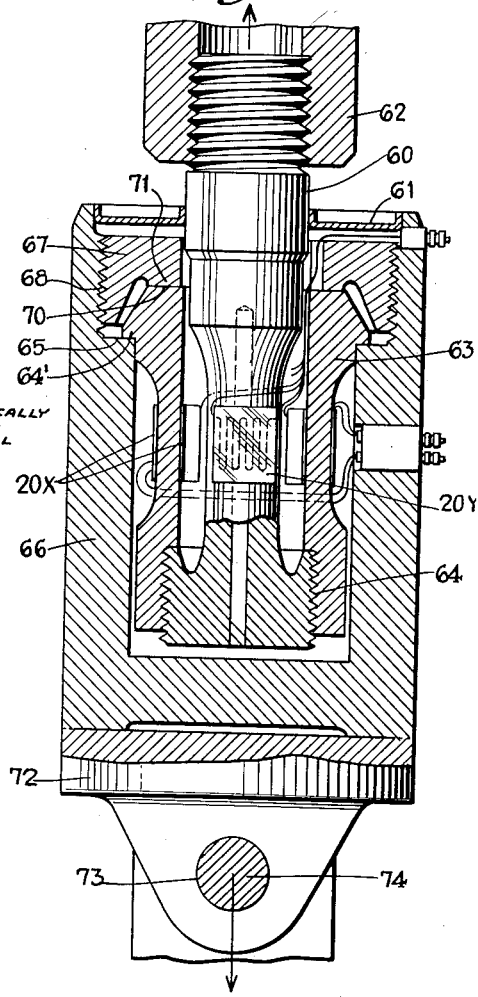
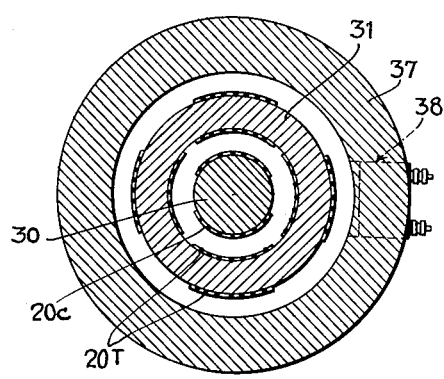
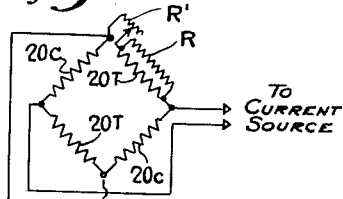
INVENTOR.
THOMAS S. HARRIS, JR.
BY
Ward Neat Haselton Orme & McElhannon
ATTORNEYS.

United States Patent Office 2,814,946
Patented Dec. 3, 1957

2,814,946

LOAD MEASURING CELLS

Thomas S. Harris, Jr., Wallingford, Conn., assignor to Revere Corporation of America, Wallingford, Conn., a corporation of New Jersey Application May 27, 1955, Serial No. 511,730

10 Claims. (Cl. 73—141)

This invention relates to load measuring cells or assemblies and more particularly to apparatus of that class embodying strain gauges preferably, although not necessarily, of the form wherein filaments, or the like, of electrical resistance material are bonded to columns or the like, which are subjected to the loads to be measured.

Load measuring cells of this general class and in a form which has heretofore been widely used, are disclosed in Figures 1 to 4, inclusive, of the U. S. patent to Thurston, No. 2,488,349, granted on November 15, 1949. When cells of that form are used, they are subjected to compression by the load to be measured and whereby the columns in the cell, to which the strain guages are bonded, will be subjected to a strain, and according to Hooke's law the strain which is measured by the gauges will be directly proportional to the stress to which the columns are subjected. However, as the columns are compressed and thereby shortened by small increments under increased loads, the cross-sectional dimensionals of the columns, if not restrained, will increase according to Poisson's rule. Similarly, if the columns should be subjected to lengthwise tension, the cross-sectional dimensionals would shrink. If such cross-sectional dimensions did not change, then the fibre stress in the columns would be proportional to the total load and then a curve representing the relationship between true loads and the loads indicated by the cell would be a straight line. But because of the slight changes in the cross-sectional dimensions, the rate of increase of the fibre stress and of the consequent strain, decreases by small increments with increments of increased compressive loads, and the opposite effect occurs with increasing tension loads. Hence, with such cells of the type heretofore generally used, wherein the columns bearing the gauges are subjected to compression, the curve representing the relationship of true loads to the loads indicated by the cell, will have a gradual sagging curvature with heavier loads. Heretofore to compensate for such deviation from a straight line relationship, it has been the practice manually to make certain balancing adjustments in the instrumentation used to measure the output from the gauges. But this procedure, in addition to involving an inconvenience, prevents ready interchangeability of the cells in use, and also where a plurality of the cells are used collectively, as for weighing a platform for example, the total output from the group of cells will generally involve at least some slight deviation from what it should be to represent the true load, because the compensations necessary for the different cells will differ slightly and thus cannot readily be made for the group as a whole. For example, if a weighing platform is supported by four identical cells but which give slightly non-linear responses and all cells are loaded to one-half full load by a weight placed in the center of the platform, then the total output from all four cells will involve a certain deviation. Now if the load on the platform is moved to another point where it is completely supported by only two of the four cells, the idle cells will have zero output and the two fully loaded cells will have full output but with a percentage deviation different from the deviation in the total output when all four cells were under one-half of their full load. Hence merely by moving a load about on the platform the total output from identical but non-linear cells will change and this change cannot be compensated for without correcting each cell output individually or by eliminating the non-linearity.

But by the use of the present invention, it has been found that a cell of this class may be so made as to provide a straight line relationship between the true loads and the indicated loads substantially throughout the effective range of response of the cell, thereby avoiding the compensations necessary to correct deviations at different loads in different cells, and permitting the use of standardized cells interchangeably and in groups giving highly accurate responses.

Proposals were made in the above-mentioned patent for achieving this result, as with a column such as of Figure 15 of said patent having a gauge of a special form which encircles a specially shaped column and so that the gauge filament is tensioned when the column is under compression, the column being intended to have a shape such that the gauge would give a straight line response. However, the forming of such specially shaped columns and the applying thereto of such special encircling type gauges, involves considerable difficulties and possible resulting inaccuracies which are avoided by the present invention.

According to the present invention, the strain gauges used in the cell may be of a well-known conventional type but are in part bonded to members which when under load will be in tension and in part bonded to members which, due to the same load, will be under compression. The cells are then so connected to the output measuring instrumentation in a bridge circuit or otherwise that the deviations from a straight-line response of the cells under tension will offset or cancel, so to speak, such deviations in the output of the cells under compression. Thus, in a highly reliable and convenient way, the total output of the cell is made to vary directly in proportion to the load variations. Furthermore, if the cells are interconnected in a bridge circuit, two opposite sides of the bridge may comprise gauges under tension, whereas the other two sides comprise gauges under compression. Heretofore in such bridge circuit connections, it has been the practice to have two sides of the bridge embody inactive or dummy resistances, but with the present invention, since all four sides of the bridge may comprise accurate and active strain gauges, the available output response of the cell is, in effect double, as compared with the general practice heretofore.

Other and more specific objects, features and advantages of the invention will appear from the detailed description given below, taken in connection with the accompanying drawings which form a part of this specification and illustrate by way of example the presently preferred embodiments of the invention.

In the drawings:

Figure 1 is a perspective view of one embodiment of a cell embodying the present invention;

Figures 2 and 3 are sectional views taken substantially along lines 2—2 and 3—3 of Figure 1;

Figure 4 is a vertical sectional view of an alternative embodiment of the invention;

Figure 5 is a horizontal sectional view taken along line 5—5 of Figure 4;

Figure 6 is a sectional view of another alternative embodiment;

Figure 7 is a diagram of the electric bridge circuit which may be used for interconnecting the strain gauges in accordance with the invention; and Figure 8 shows, somewhat exaggerated, curves indicating the relationship of the true loads and indicated loads and the deviations from a straight line which occur respectively with gauges under compression and under tension.

The device in the form shown in Fig. 1 may, if desired, be formed essentially of one integral piece of metal 10 which, for example, may be cast by the investment process or by other methods, or possibly formed of extruded steel. This integral member comprises a rigid base portion 11, and a pair of outer relatively rigid upstanding supporting portions 12 and 13. The latter, at their upper ends, are made integral respectively with two depending portions 14, 15 which under load are subjected to tension. And the latter portions at their lower ends merge into a solid and relatively rigid portion 16, at the middle of which there is an upstanding portion 17 which when under load is under compression. The upper end of portion 17 is formed with a load-receiving enlargement 18. Thus if the base 11 is placed upon a rigid support and the load to be measured is applied to the portion 18, then portion 17 will be subjected to compression stress, while the portions 14 and 15 will be in tension. As indicated, filament resistance type strain gauges 20T and 20C are bonded to each of the portions 14, 15 and 17, for example, at about midway of their lengths. The two outside columns 12 and 13 being possibly subject to some bending under certain conditions, are not in the form shown, provided with strain gauges. While the gauges are, as shown, placed on the wider or side surface of the portions 14, 15 and 17, it will be understood that they might be placed on the narrower or edge surfaces which are more accessible. However, the proper placement of the gauges tends to be quite critical if they are placed on such edge surfaces, in the sense that if they are not accurately centered, then any bending of the columns will either add or subtract from the output indications of the uncentered gauges. This matter is less critical if the gauges are placed on the wider surfaces because of the reduced stress gradients thereon. It will be apparent that the wire filaments of strain gauges 20T will be subjected to tension when the cell, as shown in Fig. 1, is under compression, whereas the gauges 20C will be simultaneously subjected to compression. Preferably these two sets of gauges are provided in such numbers and form and are so mounted that the total of the responses from gauges 20T will substantially equal the total of the responses from the gauges 20C, although that is not necessarily so since in connection with the bridge circuit in which the gauges are interconnected, suitable arrangements of compensating resistances, if desired, may be included in case the output from one set of gauges is larger than from the other. While in Fig. 3 gauges are indicated as provided on both wide surfaces of all of the column portions 14, 15, and 17, this would not be necessary in practice since it will be apparent that one gauge, for example, might be placed on each column portion.

As will be apparent from Figs. 1 and 3, the central column portion 17, which is compressed up on the loading, is shown as being approximately twice as thick as the tensioned column portions 14 and 15. This will enable the one compression portion 17 to assume the load equal to that carried by each of the two tensioned portions 14 and 15 and whereby the total deformation of portion 17 under compression will be approximately equal to and opposite the deformation of each of the portions 14 and 15. Then to obtain a response from the compressed gauges 20C equal to that from the tension gauges 20T, it may be desirable to place two gauges on portion 17 with one gauge each on portions 14 and 15, assuming that all of the gauges are of like construction.

As indicated in Fig. 1, two horizontal spring strips, as at 22, 23, may be brazed or welded as at 24, 25, respectively, upon opposite vertical surfaces of the load-carrying enlargement 18. That is, edge portions as shown may be bent up at right angles to the horizontal plate-like portions of these strips, so that such edges may be conveniently welded, brazed or otherwise affixed to the central load-carrying portion. The outer ends or edges of the strips 22, 23 may be welded, brazed or otherwise affixed at 26, 27, to the top outer edges of the supporting portions 12 and 13 respectively. To facilitate such welding, the latter edges may be undercut as at 28, 29, to provide relatively thin upper outer edge portions at 26, 27 from which the welding or brazing heat will not be dissipated so rapidly as to prevent secure welding. The purpose of the two strips 22, 23 is to minimize the possibility that the load-supporting portion 18 will be deflected to either side when in use, which deflection, if it occurred, would introduce sideways bending forces in the column portions 14, 15 and 17, and thereby possibly interfering with the accuracy of the responses of the gauges. It should be noted that the plates on strips 22, 23 should be securely affixed at their edges to the portions 18 and to the members 12 and 13 in such a way as to avoid any possibility in practice of slippage between these parts which would involve unpredictable or irregular frictional forces interfering with the accuracy of the cell.

A cell with the unitary integral construction, as shown in Fig. 1, has the advantage that there are no joints between the load-receiving portions and the column portions which are stressed, and thus the possibility of any slight slippage or unpredictable frictional effects between these portions is eliminated, in addition to providing an inexpensive and easily assembled construction, which may be manufactured in quantities with uniformity and according to predetermined accurate standards.

In Fig. 8, curves are shown for indicating the relationship of the true load and the indicated load, respectively, for the gauges 20C and 20T. That is, as indicated by the curve C with heavier and heavier loads, the gauges 20C will give indications or responses which gradually decrease respectively, as compared with the desired straight line response, that is to say, giving what may be termed a "negative" deviation. Similarly, the gauges 20T will give indications or responses as indicated by the curve T, which, with heavier and heavier loads respectively, will increase more and more as compared with the desired straight line response, or, in other words, a "positive" deviation. Although these effects as indicated in Fig. 8 are somewhat exaggerated, yet in practice they are great enough to prevent accurate weighing. But by properly interconnecting the gauges, the deviations as per curve C may be opposed to those of curve T, and then the overall total result can be made to provide a substantially straight-line response. This may be done, for example, by interconnecting the gauges 20C, 20T in a bridge circuit as shown in Fig. 7. In some cases, the responses from gauges 20C may involve substantial deviations greater or less in magnitude than the opposite deviations of gauges 20T. In that case steps may be taken to "match" the positive and negative deviations. For example, if one or both gauges 20T have the larger deviations, then as indicated in Fig. 7, one or both thereof may be shunted as by a resistance R. Then in order to re-balance the bridge circuit an additional resistance R' may be placed in series with the shunted gauge. In this way the no-load bridge resistance will not be changed but the effective response from the shunted gauge or gauges may be appropriately reduced.

Fig. 4 illustrates another embodiment of the invention in the form of a hermetically sealed cell, particularly adapted for compression loads. Here the center column 30 is provided as a compression member having bonded thereon gauges 20C. An intermediate column portion 31 of a form similar to a cylinder is provided and adapted at the same time to be subjected to tension, same bearing gauges as indicated at 20T. Although gauges 20T are here shown on both inner and outer surfaces of member 31, it may usually be preferable that they be mounted on only the outer surface. The lower end of the center column 30 may be affixed as by screw threads 32 to the base portion 33 of member 31.

As shown, electrical connections as at 34 from the gauges 20C may pass up over the upper edge of member 31, through a groove at 35 in the latter member and another groove at 36 formed in an outer shell or casing 37, for the cell. The leads then, as indicated, may pass through suitable hermetically sealed terminal outlet means as at 38. The electrical connections for the gauges 20T may also be brought out through portions of such hermetically sealed outlet means, as shown.

The casing 37 for the cell, as shown, may be formed with a rigid base portion 40 and the upper end of this casing may be provided with a closure diaphragm 41 welded or otherwise securely affixed around its periphery at 42 within the upper end of the casing 40, so as to form an hermetic seal. The interior of the cell may be filled with a suitable liquid, as indicated at 43, such as oil, to reduce temperature gradients and the climatic effects of varying barometric pressures, particularly on the "no-load" output on the cell. Alternatively, if desired, the cell may be filled by pouring in a suitable material such as a wax or other material which will solidify and thereby reduce the effect of vibrations on the cell and possibly render it unnecessary to provide an hermetic seal therefor.

Preferably, this cell may be formed with an additional top cover 44 threaded in place as indicated at 45 and comprising a rigid rim made integral with a diaphragmlike portion 46, which in turn may be made integral with a central load-transmitting portion 47 which bears against diaphragm 41. The load-transmitting portion 47 serves to assure uniform compression loading on the center of diaphragm 41, and thence on the upper rounded end 48 of the center column 30. This outer screw cover portion also serves to protect the hermetic seal afforded by the diaphragm 41 safely against physical abuse and at the same time it provides means for applying a definite "pre-load" to the center column thereby eliminating so-called "no-load" signals and consequent possible inaccuracies. That is, the top cap may be screwed down or adjusted in position until a desired "pre-load" is established on the column means of the cell, then it may be locked in place as by having a depending portion 50 which may be bent into a milled slot 51 formed in the casing. Any other suitable locking means as desired may be used for this purpose.

The same comments as heretofore given as to the gauges 20C and 20T and the number and type used as well as the way in which they are electrically connected are applicable to the embodiment of Figs. 4 and 5 as well as the further embodiment of Fig. 6 which is about to be described.

While the embodiment of Fig. 1 may be formed with suitable means for coupling thereto a tension load instead of a compression load, another embodiment is shown in Fig. 6, as particularly arranged to receive tension loads, and this third embodiment may of course also be used in compression, if desired.

In Fig. 6, a central column 60 may extend up through the sealing diaphragm 61 (similar to the sealing diaphragm 41 of Fig. 4) and be provided with a tension-receiving coupling 62, as indicated, and an outer load-receiving cylinder-like member 63 may have threaded engagement as at 64 with the member 60. The members 60 and 63 are so related and mounted that they are adapted to be strained by compression and tension, respectively, or vice versa. The respective gauges thereon are accordingly identified in Fig. 6 by the numerals 20X and 20Y.

For retaining the member 63 in proper position, its upper portion may be formed with flange 64' for engaging the upper, inner peripheral edge of a flange 65, formed in a casing 66. It will be apparent that the engaging flanges 64', 65 provide means for holding member 63 in place in case it is subjected to the downward load, causing tension therein. To hold the member 63 in place when it is subjected by the member 60 to an upward force and hence is under compression, there may be provided a ring 67 threaded in place as at 68 within the upper end of the casing. Then the engagement of the upper edge surface 70 on member 63 with a surface 71 on ring 67 will serve to hold member 63 against being pulled upwardly. If the cell of Fig. 6 is to be subjected to a tension load, a lower end portion may have welded thereon a suitable member as at 72, shaped for example with an aperture 73 for receiving a pin 74 against which downward force may be applied.

The cell of Fig. 6 may have sealed outlet terminals similar to that of Fig. 4 and may, if desired, also be similarly filled with a liquid.

In all of the examples either the top or the bottom portions, respectively, may be considered as the portions which receive and resist the force of the applied loads.

Although certain particular embodiments of the invention are herein disclosed for purposes of explanation, various further modifications thereof, after study of this specification, will be apparent to those skilled in the art to which the invention pertains. Reference should accordingly be had to the appended claims in determining the scope of the invention.

What is claimed and desired to be secured by Letters Patent is:

1. In a load measuring device, the combination comprising a first column means adapted to receive at one end loads to be measured, a second column means connected at one end to the other end of said first column means, said second column means extending from the connection back along said first column means, and means engaging the other end of said second column means for receiving and resisting the forces of the loads applied to the first end of the first column means and whereby such loads cause one of the column means to be stressed in tension while the other is stressed in compression by such loads, and strain gauges mounted on said column means respectively and adapted to be interconnected whereby positive deviations of the responses of a gauge or gauges on the column means stressed in tension may be used to counteract negative deviations occurring in the responses of the gauge or gauges on the column means which is stressed in compression.

2. A combination in accordance with the foregoing claim 1 and in which the column means and the means for receiving and resisting the forces of the loads are made in one integral piece of material, the first column means being located at or adjacent the mid-portion of said piece, the second column means comprising two portions located at opposite sides respectively of the first column means and each having one end merging into the end of the first column means opposite from its load-receiving portion, the other ends of the second column means respectively merging into outer supporting column means, the latter being integrally interconnected to form the load-resisting portion at the end of the device opposite from the load-receiving portion.

3. A combination in accordance with claim 2 and in which a spring strip positioned in a plane transverse to the axes of the column means is secured at one end with respect to the load-receiving end of the first column means and secured at its other end to the adjacent end of the outer supporting column means.

4. A combination in accordance with claim 2 and in which two spring strips are provided, each of which has an end secured respectively to opposite sides of the load-receiving portion of the first column means and the other ends secured respectively to adjacent portions of the outer column means.

5. A combination in accordance with claim 1 and in which the second column means is of generally cylindrical shape and surrounds the first column means, and the load-resisting means comprises a casing surrounding the column means.

6. A combination in accordance with claim 2 and in which an end of the casing is closed by a flexible diaphragm bearing against the first end of the first column means.

7. A combination in accordance with claim 1 and in which the load-resisting means comprises a casing surrounding the column means, said casing having an end closure at the load-receiving end of the first column, in the form of a flexible diaphragm which provides a fluid-tight closure for the casing and the casing being filled with a liquid.

8. A combination in accordance with claim 1 and in which the column means are contained in a casing having an end closure in the form of a flexible diaphragm engaging the load-receiving end of the first column, and a load-transmitting element is provided in engagement with the outer surface of said diaphragm, said element being retained in position by spring means urging said element against the diaphragm to provide a predetermined "pre-load" on the device.

9. A combination in accordance with claim 1 and in which the device is surrounded by a casing closed at one end by cover means, means securing said cover means in place and constructed and arranged to permit adjustments of the position of the cover means in a direction longitudinally of the column means, said cover means including a closure diaphragm embodying a portion for transmitting loads to the load-receiving end of the first column means, the adjustable means permitting the position of the cover to be so adjusted that the diaphragm thereof will cause the load-transmitting portion to apply a predetermined "pre-load" to the device.

10. A combination in accordance with claim 1 and in which the load-ressiting means comprises a casing surrounding the column means, said casing having a diaphragm closure at one end through which the first column means extends for receiving a load, the end portion of the second column means opposite from its connection to the first column means having portions which are gripped between an internal flange in the casing and a removable ring adjustably affixed within the casing.

References Cited in the file of this patent

UNITED STATES PATENTS

| | | |
|---|---|---|
| 2,036,458 | Carlson | Apr. 7, 1936 |
| 2,487,595 | Ruge | Nov. 8, 1949 |
| 2,520,923 | Franzel et al. | Sept. 5, 1950 |
| 2,561,318 | Ruge | July 17, 1951 |